US006851353B1

(12) United States Patent
Quantz et al.

(10) Patent No.: US 6,851,353 B1
(45) Date of Patent: Feb. 8, 2005

(54) NUT TRANSPORT ELEMENT FOR USE IN HIGH PRODUCTION NUTCRACKING APPARATUS

(75) Inventors: James B. Quantz, Lexington, SC (US); Pascal W. Pitts, Cayce, SC (US); John L. Feaster, Columbia, SC (US)

(73) Assignee: Machine Design Incorporated, West Columbia, SC (US)

( * ) Notice: Subject to any disclaimer, the term of this patent is extended or adjusted under 35 U.S.C. 154(b) by 0 days.

(21) Appl. No.: 10/659,135

(22) Filed: Sep. 10, 2003

(51) Int. Cl.[7] .................................................. A23N 5/00
(52) U.S. Cl. .............................. 99/571; 99/574; 99/581
(58) Field of Search .......................... 99/568, 571–576, 99/577–579, 580–583; 426/481, 482; 30/120.1–120.5; 198/622

(56) References Cited

U.S. PATENT DOCUMENTS 3,871,275 A  *  3/1975  Quantz ........................ 99/571
5,247,879 A  *  9/1993  Frederiksen et al. .......... 99/575
5,623,867 A      4/1997  Quantz
6,205,915 B1     3/2001  Quantz
6,270,824 B1     8/2001  Quantz
6,584,890 B1     7/2003  Quantz et al.
6,588,328 B1  *  7/2003  Quantz et al. ................ 99/571

* cited by examiner

Primary Examiner—Timothy F. Simone
(74) Attorney, Agent, or Firm—Alston & Bird LLP

(57) ABSTRACT

A lightweight feed chain for a high speed nutcracking apparatus and which is composed of a plurality of individual nut transport elements mounted in succession. The nut transport elements are block-like in configuration, and each element includes a nut receptacle extending laterally across the upper face which is sized to accommodate a single nut of a given size. The elements are formed of a high impact plastic material which has been found to reduce wear and breakage from contact with the nutcracking components of the apparatus, and to reduce the weight of the chain. Also the elements may be color coded, with each color indicating a particular size of the receptacle.

7 Claims, 3 Drawing Sheets

NUT TRANSPORT ELEMENT FOR USE IN HIGH PRODUCTION NUTCRACKING APPARATUS

BACKGROUND OF THE INVENTION

The present invention relates to an improved nut transport element and feed chain for use in a high production nutcracking apparatus, of the type disclosed for example in U.S. Pat. Nos. 5,623,867; 6,205,915; and 6,584,890.

The nutcracking apparatus as disclosed in the above patents includes a rotatable turret which mounts a plurality of cracking units arranged about its periphery, with each cracking unit having an opening adapted to receive an individual nut from a nut feed conveyor which comprises a plurality of nut transport elements mounted in succession on a feed chain. Each of the nut transport elements includes an upwardly open transverse receptacle for holding an individual nut, and each cracking unit on the turret has an anvil which is moved axially into the receptacle at a pickup point so that the nut is engaged between the anvil and a crack die on the other side of the opening.

In operation, the feed conveyor moves tangentally past the rotating turret so that the anvils of the cracking units enter the receptacles of respective nut transport elements at the pickup point and engage and pick up the nut. After the cracking unit and engaged nut have moved away from the pickup point, the crack die of the cracking unit applies an impact to the nut to crack the shell.

The timing and alignment of the feed chain with respect to the cracking units is important to the proper operation of the nutcracking apparatus, and this requirement is the subject of U.S. Pat. No. 6,270,824. However, even with the improved alignment features as set forth in the '824 patent, it occasionally happens that the apparatus is operated with the feed chain and turret slightly out of alignment, in which case the anvils of the cracking units can engage the side walls of the receptacles of the nut transport elements. This results in rapid wear on the walls of the receptacles of the nut transport elements, which are conventionally formed of machined bar stock composed of an aluminum alloy. Such contact can also result in wear of the anvil and may require replacement of the entire feed chain, as well as the anvils of the cracking units. Further, in the case of a relatively significant misalignment, the movement of the anvil can break a "wing" of the nut transport element (the "wing" being defined below with respect to FIG. 3). Such breakage also usually requires the replacement of the effected nut transport elements.

The replacement of the feed chain may also be required when nuts of different average size are being processed. In particular, it is important for the proper operation of the apparatus to have the receptacles of the nut transport elements sized to accommodate the nuts being processed, and thus it has been conventional to provide three or four feed chains with each apparatus, with the chains having nut transport elements of differing sizes. Thus when the size of the nuts being processed changes, a feed chain is selected and installed which has a receptacle size which is most suitable for the nuts to be processed.

As will be apparent, the changing of the feed chain is a labor intensive and time consuming operation, and it is an object of the present invention to reduce the number of required changes, and to simplify the labor and time required when a change is required.

SUMMARY OF THE INVENTION

The above and other objects and advantages of the invention are achieved by the surprising discovery that the nut transport elements may be fabricated from a high impact plastic material, and the use of such material significantly reduces or eliminates wear and damage from repeated contact with the anvils of the cracking units, as compared to the wear and damage suffered by nut transport elements formed of the conventional aluminum alloy. As a result, the frequency of changes of the feed chain can be significantly reduced. Also, the weight of the feed chain is significantly reduced, which simplifies the changing procedure when it is required.

As a further aspect of the invention, the use of a high impact plastic material in forming the nut transport elements permits the elements to be easily color coded so that each color represents a predetermined size of the associated receptacles. This greatly reduces the opportunity for error in both the construction of the feed chains and their installation.

BRIEF DESCRIPTION OF THE DRAWINGS

Some of the objects and advantages of the invention having been stated, others will appear as the description proceeds, when taken in connection with the accompanying drawings, in which.

DETAILED DESCRIPTION OF THE PREFERRED EMBODIMENT

Figure 1:
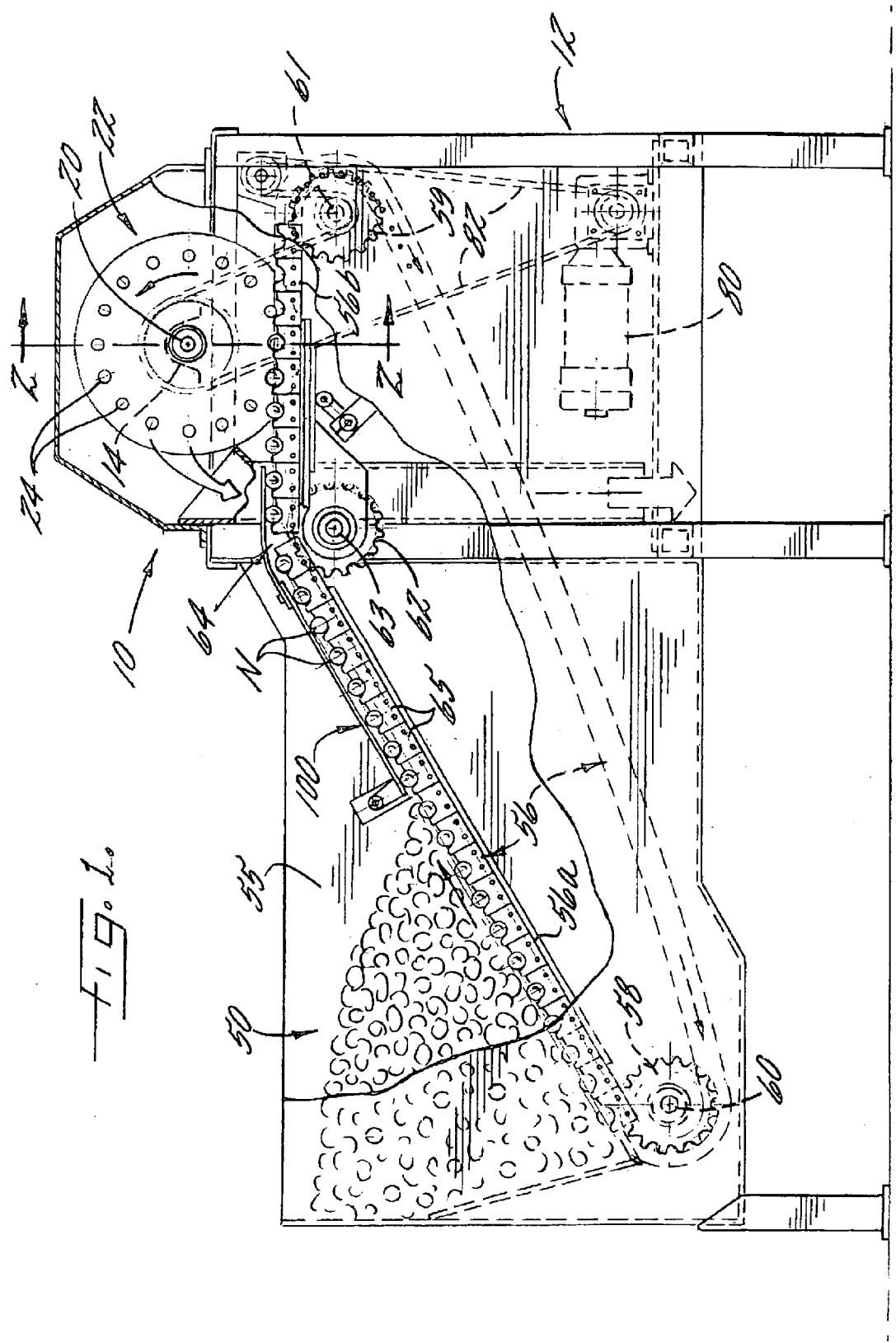
FIG. 1 is a partly sectioned side elevation view of a nutcracking apparatus which embodies the features of the present invention.
Figure 2:
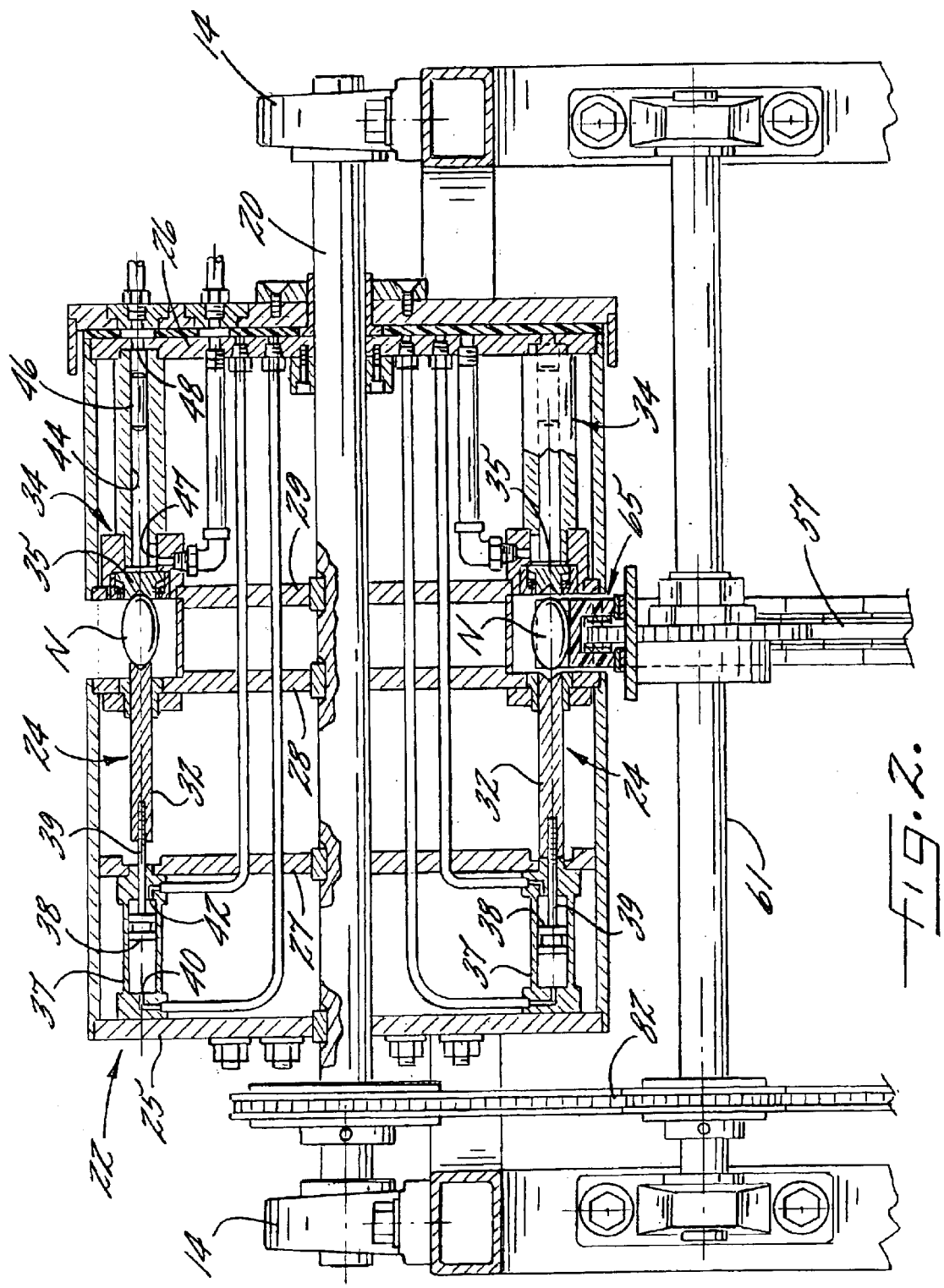
FIG. 2 is a sectioned view of the turret of the apparatus taken along the line 2—2 of FIG. 1.

Referring more specifically to the drawings, a nutcracking apparatus embodying the features of the present invention is illustrated generally at 10 in FIGS. 1 and 2. The apparatus includes a rectangular box-like frame 12 which supports a pair of bearing blocks 14 which rotatably mount a central shaft 20 which defines a horizontal central axis.

As best seen in FIG. 2, a turret 22 is fixedly mounted to the shaft 20 so as to be rotatable with the shaft about the central axis. The turret 22 comprises a plurality of elongate cracking units 24 which are circularly arranged about the shaft and supported by the end plates 25 and 26, and the intermediate plates 27, 28 and 29. There are sixteen cracking units in the illustrated embodiment and the units extend generally parallel to each other and to the central axis.

Each of the cracking units 24 comprises an anvil 32, and a cracking die assembly 34 which includes a cracking die 35. The anvil and cracking die assembly are mounted in an axially aligned, opposed relationship to define an opening for receiving a nut N therebetween. More particularly, the means for mounting the anvil 32 includes a first air cylinder 37, a piston 38 slidably disposed within the cylinder 37, a piston rod 39 interconnecting the piston and anvil, a first air port 40 disposed adjacent the rearward end of the cylinder, and a second air port 42 disposed adjacent the forward end of the cylinder. As will be apparent, movement of the piston 38 results in a corresponding movement of the anvil 32, either forwardly toward the cracking die assembly 34 or rearwardly therefrom. Such movement is controlled by air which is selectively provided to the first and second ports 40, 42 in a manner more fully disclosed in U.S. Pat. Nos. 4,418,617; 4,441,414; and 6,182,562, the disclosures of which are expressly incorporated herein by reference.

The cracking die assembly 34 is more fully described in the above referenced patents, and it includes the cracking die 35, and a second air cylinder 44. A free floating shuttle 46 is mounted so as to be closely received within the bore of the cylinder 44. In addition, there is provided an air port 47 adjacent the forward end of the cylinder and a further port 48 which extends axially through the rearward end of the cylinder.

The control system for cyclically actuating the cracking unit includes an air control system whereby air, which may include a lubricating oil mist, is selectively introduced into the four ports 40 42, 47, and 48. More particularly, upon receiving a nut N in the opening between the anvil 32 and cracking die assembly 34, air is first introduced into the port 40 so that the piston 38 and anvil 32 are moved forwardly and such that the anvil 32 operatively engages one end of the nut N in the opening. The nut thereby becomes supported between the anvil 32 and cracking die 35. The anvil 32 and cracking die 35 thereby also serve to compressively stress the retained nut. High pressure air is next injected through the port 48 and into the air cylinder 44, such that the shuttle 46 is thrust forwardly along the cylinder and impacts against the rear end surface of the cracking die 35, causing the cracking die to sharply advance a short distance forwardly against the nut and thereby crack its shell. The air in front of the advancing shuttle is permitted to exhaust through the port 47. Air next enters the port 42, causing the piston 38 and anvil 32 to move rearwardly and release the nut, and as a final step, air is caused to enter the port 47 and thereby return the shuttle 46 to its rearward position. The apparatus is then in position to receive another nut to be cracked, with the above cycle being cyclically repeated. Further details regarding the air control system for cyclically actuating the apparatus 10 may be obtained from the above noted prior patents.

The apparatus of the present invention further includes an apparatus 50 for advancing and delivering a plurality of nuts individually in succession along a path of travel to the rotating turret 22. This nut delivering apparatus include a hopper 55 for storing a relatively large quantity of the nuts to be cracked, and an endless feed conveyor 56 which includes a feed chain 57 (FIG. 2) and a pair of supporting sprockets 58, 59 mounted respectively on the shafts 60, 61, which support the feed chain. Also, there is provided an intermediate supporting sprocket 62 mounted on the shaft 63 as further described below.

The conveyor 56 is mounted for movement about the sprockets 58, 59, and includes an upper run which extends through the lower portion of the hopper 55 and along an upwardly inclined-path of travel to a delivery point adjacent the bottom dead center position of the turret 22. More particularly, the upper run of the endless conveyor includes an upwardly inclined segment 56a extending through the lower portion of the hopper, and a substantially horizontal segment 56b extending from the upwardly inclined segment to a delivery point which is tangentially aligned along the bottom dead center position of the cracking units 24. The upwardly inclined segment 56a and the horizontal segment 56b define a transition junction 64 therebetween and which is also defined by the supporting sprocket 63. More particularly, the transition junction 64 is arcuately curved in accordance with the circumferential curvature of the supporting sprocket 63.

Figure 3:
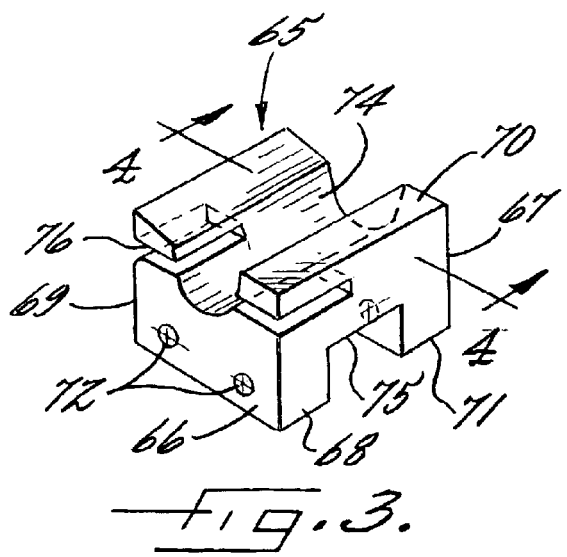
FIG. 3 is a perspective view of one of the nut transport elements of the present invention.

A plurality of block-like nut transport elements 65 are mounted in succession along the feed chain 57. As best seen in FIG. 3, each element 65 includes parallel opposite sides 66, 67, parallel opposite ends 68, 69, an upper face 70 and a bottom face 71. The upper face 70 of the element has a generally semi-cylindrical receptacle 74 which extends laterally across the upper face of the element, and so as to communicate with each of the opposite sides 66 and 67. By design, each receptacle 74 is sized to supportingly receive a single nut of the size to be cracked and which is oriented with its end to end direction extending axially along the receptacle.

Each element 65 further includes a longitudinal channel 75 in the bottom face 71 for receiving the feed chain 57, and a pair of openings 72 for receiving transverse pins (not shown) which interconnect the element to the chain. Further, each element 65 includes a slot 76 which extends longitudinally along the full length of the vertical wall of the notch 72 as seen in FIG. 3, and which is disposed parallel to the bottom face 71 of the element. The slot 76 extends laterally a portion of the distance from the notch 72 to the side 67, and communicates with the receptacle 74. Also, the slot 76 defines a pair of "wings" formed between the slot and the upper face 70. The portion of the upper face 70 forwardly of receptacle 74 may be inclined downwardly, so that the portion rearwardly of the receptacle 74 in effect protrudes upwardly so as to catch the nuts in the hopper and knock them into the receptacle.

The conveyor 56 is powered by the motor 80 and drive chain 82, which drives the sprocket 59 and which also drives the turret 22 in the manner seen in FIG. 1, and such that the transport elements 65 and thus the nuts move from the hopper tangentially past the circle defined by the rotating cracking units 24, at a speed corresponding to such rotating speed. Also, the common drive 80, 82 permits the movements of the feed conveyor 56 and the turret 22 to be coordinated so that at the delivery point, each of the cracking units 24 is aligned with a respective one of the nut transport elements 65, with the anvil 32 and cracking die 35 thereof being disposed on opposite sides of the nut transport element and aligned with the receptacle 74.

The hopper 55 includes singularizing and orienting means to insure that any nuts in excess of one are removed from the receptacle 74 of each nut transport element 65, and that each nut is oriented with its end to end direction extending axially along the receptacle 74. This singularizing and orienting means is generally indicated at 100 and is further described in U.S. Pat. No. 6,205,915, which is incorporated herein by reference.

Figure 4A:
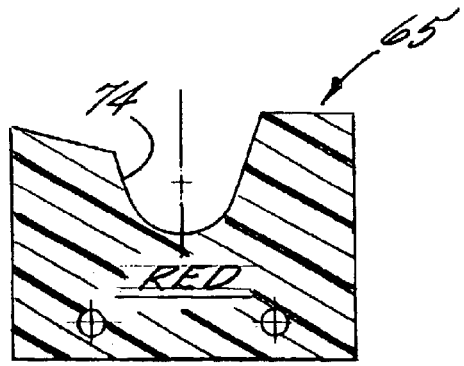
FIGS. 4A–4C are sectional views of three nut transport elements having receptacles of differing size and which are color coded to identify the size of the respective receptacles of the elements.
Figure 4B:
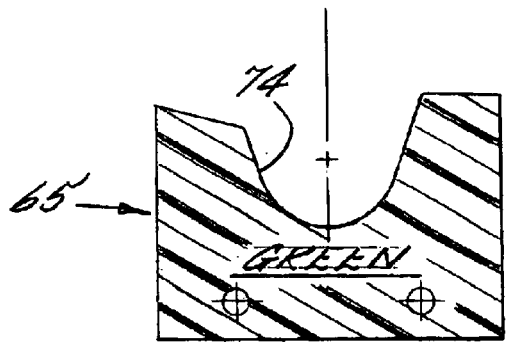
Figure 4C:
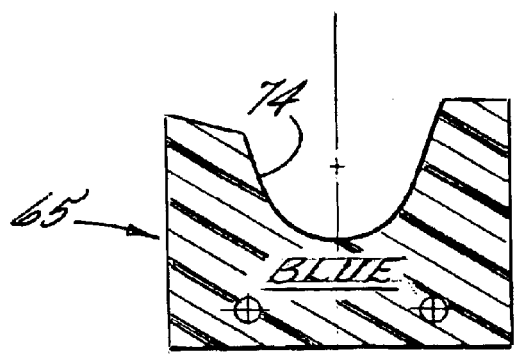

The nut transport elements of the feed chain are all of the same size, and as indicated above, it has been conventional to supply the machines with a plurality of interchangeable feed chains which have nut transport elements with receptacles 74 of slightly different size, note FIGS. 4A–4C. This permits the machine to be configured to accommodate nuts of differing average size by changing the feed chain to one having a receptacle size which matches the nut size.

As illustrated in FIGS. 4A–4C, the nut transport elements are molded of a high impact plastic material, such as 60 Duro Shore D Urethane. As indicated above, the use of such material has been found to reduce the wear and damage resulting from repeated contact with the anvils of the cracking units when the feed chain 57 and turret 22 are slightly out of alignment. In addition, the use of such plastic material significantly reduces the weight of the feed chain, as well as the manual labor required to accomplish a change of the feed chain.

As also schematically illustrated in FIGS. 4A–4C, the nut transport elements 65 having receptacles of a given size may be color coded by incorporating a colorant in the plastic material before it is molded, with a particular color indicating a nut transport element having a receptacle of a predetermined size. Thus it is very easy to verify that all of the nut transport elements on a given chain have a uniform and known receptacle size. Also the size of the receptacles on a given chain can be determined simply by viewing it.

That which is claimed:

1. A nut transport element for use in a feed chain of a high speed nutcracking apparatus, comprising a generally block-like body which includes opposite sides, opposite ends, and top and bottom faces, said top face including a generally semi-cylindrical receptacle extending laterally across the upper face and so as to communicate with both of the opposite sides, with the size of the receptacle being predetermined so as to supportingly receive a single nut to be cracked which is of a given size and is oriented with its end to end direction extending axially along the receptacle, and wherein said block-like body is formed of a high impact plastic material.

2. The nut transport element of claim 1 wherein the high impact plastic material includes a colorant which by design is representative of a particular size of the receptacle.

3. The nut transport element of claim 2 wherein the high impact plastic material consists essentially of urethane.

4. The nut transport element of claim 1 wherein said block-like body further comprises a longitudinal slot communicating with the full length of one of the sides as well as with the receptacle, and with the slot extending laterally a substantial portion of the distance across the element.

5. A lightweight feed chain for successively delivering nuts in a predetermined orientation to a cracking unit of a nutcracking apparatus, comprising an endless conveyor which comprises a plurality of individual nut transport elements mounted in succession, with each of said nut transport elements comprising a generally block-like body which includes opposite sides, opposite ends, and top and bottom faces, said top face including a generally semi-cylindrical receptacle extending laterally across the upper face and so as to communicate with both of the opposite sides, with the size of the receptacle being predetermined so as to supportingly receive a single nut to be cracked which is of a given size and is oriented with its end to end direction extending axially along the receptacle, and wherein said block-like body is formed of a high impact plastic material.

6. The feed chain of claim 5 wherein the high impact plastic material includes a colorant which by design is representative of a particular size of the receptacle.

7. A plurality of lightweight feed chains for selective use in a nutcracking apparatus for successively delivering the nuts to a cracking unit of a nutcracking apparatus, with each feed chain comprising an endless conveyor which comprises a plurality of individual nut transport elements mounted in succession, with each of said nut transport elements comprising a generally block-like body which includes opposite sides, opposite ends, and top and bottom faces, said top face including a generally semi-cylindrical receptacle extending laterally across the upper face and so as to communicate with both of the opposite sides, with the size of the receptacle being predetermined so as to supportingly receive a single nut to be cracked which is of a given size and is oriented with its end to end direction extending axially along the receptacle, and wherein the receptacles of the nut transport elements of each feed chain are of uniform size which is different from the size of the receptacles of the other feed chains, and wherein the nut transport elements of each feed chain are formed of a high impact plastic material which is color coded with a colorant which uniquely identifies the size of the receptacles of the associated feed chain.

\* \* \* \* \*